Patented June 6, 1950

2,510,921

UNITED STATES PATENT OFFICE 2,510,921

PREPARATION OF ORGANIC SULFIDES

Lewis F. Bauer, El Paso, Tex., assignor to California Research Corporation, San Francisco, Calif., a corporation of Delaware No Drawing. Application August 3, 1946, Serial No. 688,330

5 Claims. (Cl. 260—609)

This invention relates to the preparation of organic sulfides by reacting olefins with hydrogen sulfide in the presence of aluminum chloride as the effective catalyst. More particularly it pertains to the preparation of organic monosulfides from olefins and hydrogen sulfide in the presence of dry aluminum chloride as the effective catalyst.

It is the object of the present invention to provide a novel process for preparing organic sulfides from olefins and hydrogen sulfide.

It is another object of this invention to provide a process for preparing organic monosulfides suitable as gas odorants.

It has been found that these objects are accomplished by the use of aluminum chloride as the effective catalyst.

In carrying out the process of the invention in order to produce a particular organic monosulfide, the reaction conditions, such as temperature, pressure, molar ratio of the olefin to aluminum chloride catalyst and molar ratio of the olefin to the hydrogen sulfide, vary in a known manner with the nature of the feed being used. Thus, for instance, when propene is used, room temperature and atmospheric pressure are adequate to give a satisfactory yield of propyl sulfide. On the other hand, the reaction between an ethene feed and hydrogen sulfide requires a higher temperature in order to give best yields of ethyl sulfide. In each case, the necessary reaction conditions and molar ratios are desirably correlated to give optimum yields of monosulfide.

The process, as illustrated by the specific examples hereinafter, operates satisfactorily when the molar ratio of the aluminum chloride catalyst used in the reaction to the resulting sulfide product is at least 1.

The following specific examples illustrate the operation of the new process, without, however, being limitative of the invention.

Example 1

90 cu. ft. of dry cracked naphtha rectifier reflux gas of the following composition is employed as a charging stock:

| | Per cent by volume |
|---|---|
| Propene | 20 |
| Ethene | 5 |
| Butenes and butanes | 2 |
| Hydrogen sulfide | 6 |
| Ethane | 25 |
| Methane | 12 |
| Propane | 30 |

This reflux gas charge is passed through a glass reaction tube containing 1480 g. of dry, commercial-grade aluminum chloride over a period of about one hour. The reaction takes place at room temperature (70° F.) in the absence of pressure. Considerable heat is generated, and about 600 cc. of a liquid containing much aluminum chloride is obtained. Upon adding this liquid to water, it separates an oily layer. This oily layer is first washed with aqueous caustic soda and then with water. The product obtained from these washes is analyzed and yields the following data:

| | Per cent |
|---|---|
| Total sulfur | 19.4 |
| Mercaptan sulfur | .92 |
| Disulfide sulfur | .11 |
| Monosulfide sulfur | 18.37 |

The content of butenes in the original charge being very low, the formation of butyl monosulfide may be disregarded. Likewise, since ethene reacts very sluggishly at room temperature, the amount of ethyl monosulfide may also be deemed negligible. Hence, the product substantially consists of 67.7% propyl monosulfide, 2.1% propyl mercaptan and about 0.5% propyl disulfide.

Example 2

In this example propene and hydrogen sulfide are substituted in lieu of the cracked naphtha rectifier reflux gas of Example 1. The resulting product has an average molecular weight of 129 and consists substantially of 83% propyl monosulfide with a small admixture of propyl mercaptan and propyl disulfide.

The process of this invention is not limited to the reaction of propene and hydrogen sulfide. Other aliphatic and cycloaliphatic olefins, e. g., ethene, butenes, pentenes, cyclohexene and the like, as well as aralkyl hydrocarbons containing an aliphatic olefinic group, such as styrene, may be reacted with hydrogen sulfide in the presence of aluminum chloride in accordance with the process of the present invention.

Dry aluminum chloride is used as a catalyst for the process, for moisture impairs the catalytic effect of aluminum chloride. In the examples above, the product is recovered by dilution with water. However, other suitable methods may be used so as to permit the separation of the product and the recovery of dissolved aluminum chloride, e. g., by heating and vaporizing the product.

Organic monosulfides prepared in accordance with the process of the present invention are valuable chemical intermediates and have many uses in industry, particularly in the odorization of combustible gases.

In conclusion, it is emphasized that many and varied modifications of the invention permittting its adaptation in the industry may be made without departing from the spirit and the scope thereof.

I claim:

1. A process for the normal addition of hydrogen sulfide to an olefin, which comprises reacting an olefin and H2S in the presence of an aluminum chloride catalyst, the mol ratio of said aluminum chloride catalyst to the monosulfide in the reaction zone being equal to at least one in order to secure a product containing predominantly monosulfides.

2. A process for the normal addition of hydrogen sulfide to an olefin, which comprises reacting an olefin and hydrogen sulfide in the presence of an anhydrous aluminum chloride catalyst, the mol ratio of said aluminum chloride catalyst to the monosulfide in the reaction zone being equal to at least one in order to secure a product containing predominantly monosulfides.

3. A process for the normal addition of hydrogen sulfide to a normally gaseous olefin, which comprises reacting a normally gaseous olefin and hydrogen sulfide in the presence of an aluminum chloride catalyst, the mol ratio of said aluminum chloride catalyst to the monosulfide in the reaction zone being equal to at least one in order to secure a product containing predominantly monosulfides.

4. A process of normal addition of hydrogen sulfide to a normally gaseous mixture of olefins in which the predominant olefin is propene, which comprises reacting the mixture of olefins and hydrogen sulfide in the presence of aluminum chloride catalyst, the mol ratio of said aluminum chloride catalyst to the monosulfide in the reaction zone being equal to at least one in order to secure a product containing predominantly monosulfides.

5. A process of normal addition of hydrogen sulfide to propene, which comprises reacting propene and hydrogen sulfide in the presence of an aluminum chloride catalyst, the mol ratio of said aluminum chloride catalyst to propyl monosulfide in the reaction zone being equal to at least one in order to secure a product containing predominantly propyl monosulfide.

LEWIS F. BAUER.

REFERENCES CITED

The following references are of record in the file of this patent:

UNITED STATES PATENTS

| Number | Name | Date |
| --- | --- | --- |
| 2,211,990 | Shoemaker | Aug. 20, 1940 |
| 2,352,435 | Hoeffelman | June 27, 1944 |
| 2,366,453 | Meadow | Jan. 2, 1945 |
| 2,382,700 | Eby | Aug. 14, 1945 |
| 2,434,510 | Olin | Jan. 13, 1948 |
| 2,443,852 | Eaton et al. | June 22, 1943 |
| 2,447,481 | Bell et al. | Aug. 24, 1948 |